United States Patent [19]

Longo et al.

[11] Patent Number: 4,741,974
[45] Date of Patent: May 3, 1988

[54] COMPOSITE WIRE FOR WEAR RESISTANT COATINGS

[75] Inventors: Frank N. Longo, East Northport; Joseph D. Reardon, Hauppauge, both of N.Y.; Anil Bansal, Patterson, N.J.

[73] Assignee: The Perkin-Elmer Corporation, Norwalk, Conn.

[21] Appl. No.: 865,226

[22] Filed: May 20, 1986

[51] Int. Cl.4 .................. B32B 15/02; B23K 35/22
[52] U.S. Cl. .................................. 428/558; 428/563; 219/146.51
[58] Field of Search ............... 428/558, 560, 562, 563, 428/564; 219/146.31, 146.51

[56] References Cited

U.S. PATENT DOCUMENTS

| | | |
|---|---|---|
| 2,868,639 | 1/1959 | Gonser . |
| 2,936,229 | 5/1960 | Shepard . |
| 3,332,752 | 7/1967 | Batchelor et al. . |
| 3,627,979 | 12/1971 | Quass . |
| 3,632,952 | 1/1972 | Rotolico et al. . |
| 3,991,240 | 11/1976 | Harrington et al. . |
| 4,173,685 | 11/1979 | Weatherly ............................ 75/238 |
| 4,396,820 | 8/1983 | Puschner . |

FOREIGN PATENT DOCUMENTS 118307  9/1984  European Pat. Off. .
541619  3/1977  U.S.S.R. .......................... 219/146.51

*Primary Examiner*—John F. Terapane
*Assistant Examiner*—Eric Jorgensen
*Attorney, Agent, or Firm*—Herbert S. Ingham; F. L. Masselle; E. T. Grimes

[57] ABSTRACT

A composite wire useful for arc gun spraying is formed of an alloy sheath comprising iron, nickel, or cobalt, and a core comprising boron-containing powder of boron and/or boron carbide sufficiently fine in size such that the boron is substantially dissolved in a coating produced by arc gun spraying the composite wire. Where the boron substance includes boron, the core should further comprise fine carbon powder less than 20 microns in size blended with the boron powder. Preferably a substantial portion of the boron-containing powder is less than 20 microns. In a particularly desirable embodiment, the sheath is formed of mild steel and the core comprises boron carbide and an alloy powder such as ferromolybdenum.

38 Claims, No Drawings

COMPOSITE WIRE FOR WEAR RESISTANT COATINGS

This invention relates to a wire that is useful for arc gun spraying and particularly to a composite wire having a sheath of iron, nickel or cobate and a core that includes a boron-containing powder.

BACKGROUND OF THE INVENTION

Thermal spraying, also knwon as flame spraying, involves the heat softening of a heat fusible material such as metal or ceramic, and propelling the softened material in particulate form against a surface which is to be coated. The heated particles strike the surface and bond thereto. A conventional theremal spray gun is used for the purpose of both heating and propelling the particles.

A thermal spray gun normally utilizes a combustion flame, a plasma flame, or an electrical arc to produce the heat for melting of the spray material It is recognized by those of skill in the art, however, that other heating means may be used as well, such as resistance heaters or induction heaters, and these may be used alone or in combination with other forms of heaters.

The material may be fed into a heating zone in the form of powder or a rod or wire. In the wire type thermal spray gun, the rod or wire of the material to be sprayed is fed into the heating zone formed by a flame or the like, such as a combustion flame where it is melted or at least heat-softened and atomized, usually by compressed gas, and thence propelled in finely divided form onto the surface to be coated. In an arc wire spray gun two wires are melted in an electric arc struck between the wire ends, and the molten metal is atomized by compressed gas, usually air, and sprayed onto a workpiece to be coated. The rod or wire may be conventionally formed as by drawing, or may be formed by sintering together a powder, or by bonding together the powder by means of an organic binder or other suitable binder which disintegrates in the heat of the heating zone, thereby releasing the powder to be sprayed in finely divided form. In other forms the wire may have a coating sheath of one component and a core of the others, or may be made by twisting strands of the components.

European patent application, publication No. 0 118 307 (Tenkula), discloses a composite wire which can be used for arc gun spraying, comprising a sheath made from soft metal, such as soft alloyed steel, and a core consisting of metal powder or a mixture of a metal powder and "special carbides" and/or oxides. Examples in Tenkula of the special carbides are the carbides of chromium, tungsten, vanadium, titanium, niobium, silicon, molybdenum, boron and the like. Examples of the main composition of the core are taught to be C, Cr, Si, Mn, V, B, W, Mo, Nb, Ni, Co, Cu, Ti, Al and Fe. The grain size of the powder in the core is given as 20–300 microns.

Similarly, U.S. Pat. No. 3,332,752 (Batchelor et al) teaches the flame spraying of a filled tube containing powders of metals, alloys, oxides, carbides and lubricants, the powder size being greater than 600 mesh (20 microns).

Welding electrodes may be in composite form of a sheath and a powder core. The requirements for welding are somewhat different than for arc gun spraying in that the welding process melts and flows the material directly onto the workpiece. Thus such electrodes generally include a flux such as an active metal fluoride. U.S. Pat. No. 3,627,979 (Quaas) typifies the art on welding electrodes, disclosing a sheath of steel, nickel alloy or cobalt alloy filled with particles finer than 25 mesh (800 microns). The core may include refractory carbides of chromium, tungsten, titanium and vanadium.

Art such as described above involving carbide-containing composite wires for arc gun spraying, combustion flame spraying or welding is broadly directed to producing coatings that contain the carbide. To achieve this result the above references indicate that the core powder particles be relatively coarse, generally at least 20 microns where the lower limit is given. Such a lower limit on powder size is also generally indicated for any core powders including metals (e.g. Tenkula).

Certain compositions of composite materials not containing carbide particles nevertheless produce coatings that are quite hard and wear resistant. For example, U.S. Pat. No. 3,991,240 (Harrington et al) discloses a composite powder having a cast iron core clad with molybdenum and boron particles. Such a material is useful for such applications as piston ring coatings, being a potential improvement over the industry standard coating of thermal sprayed molybdenum. However, further improvement is desired to further extend the life of components in engines and the like.

Self-fluxing alloy powders of nickel and cobalt are quite common for hard facing coatings. They contain boron and silicon which act as fluxing agents during the coating operation and as hardening agents in the coating. Usually self-fluxing alloys are applied in two steps, namely thermal sprayed in the normal manner and then fused in situ with an oxyacetylene torch, induction coil, furnace or the like. The fluxing agents make the fusing step practical in open air. However, the alloys may also be thermal sprayed with a process such as plasma spraying without requiring the fusing step, but the coatings are not quite as dense or wear resistant. Generally self-fluxing alloy coatings are used for hard surfacing to provide wear resistance, particularly where a good surface finish is required since the fusing produces a coating having very low porosity. Typical self-fluxing alloy powder compositions are disclosed in U.S. Pat. Nos. 2,868,639 and No. 2,936,229.

In view of the foregoing an object of the present invention is to provide a novel composite wire useful in the arc gun spraying process.

Another object is to provide a novel wire for producing thermal sprayed coatings that have exceptional hardness and wear resistance.

Yet another object is to provide a novel wire for producing thermal sprayed coatings containing alloyed boron and carbon.

A further object is an improved arc gun spray process that incorporates the use of a novel composite wire.

These and still further objects will become apparent from the following description.

BRIEF DESCRIPTION OF THE INVENTION

According to the present invention a composite wire useful for arc gun spraying is formed of an alloy sheath comprising iron, nickel, or cobalt, and a core comprising boron-containing powder of boron and/or boron carbide sufficiently fine in size such that the boron is substantially dissolved in a coating produced by arc gun spraying the composite wire. Where the boron substance includes boron, the core should further comprise fine carbon powder less than 20 microns in size blended with the boron powder. Preferably a substantial portion of the boron-containing powder is less than 20 microns. In a particularly desirable embodiment, the sheath is formed of mild steel and the core comprises boron carbide and an alloy powder such as ferromolybdenum.

DETAILED DESCRIPTION OF THE INVENTION

The composite wire of the present invention is fabricated of an alloy sheath comprising as a major component at least one of the metals iron, nickel, and cobalt. The core of the composite wire is formed of powder which includes boron-containing powder of boron and/or boron carbide sufficiently fine in size for the boron to be substantially dissolved in a coating produced by arc gun spraying the composite wire. For example the boron-containing powder is predominantly of size less than 20 microns. Where the boron-containing powder includes unalloyed boron powder, then it is desirable to blend fine carbon powder with the boron. However, fine boron carbide is preferred.

The core also may contain powder of other alloying constituents desired for the coating produced by thermal spraying the wire. The wire is especially useful for thermal spraying by the two-wire arc gun spraying process. The coatings produced are hard and wear resistant, by virtue of the dissolution of the boron and carbon or the boron carbide being well dispersed and uniformly alloyed into the coating.

The wire is made by any known or desired method such as filling tube of the sheath metal with the powders for the core and drawing to suitable size for thermal spraying. Desirably the sheath is formed from metal strip in the manner of making welding electrodes as described, for example, in U.S. Pat. No. 4,396,820.

In this method the powder is introduced into the trough of the strip as it is being shaped into a tube by rolling. The filled tube is then further rolled or drawn and annealed in alternating steps until final size is obtained.

It is generally most practical if the sheath metal is soft enough to be formed readily in the standard rolling and drawing processes. Thus the sheath metal should be relatively pure or at least low in alloying elements. Mild steel having low carbon content as in AISI 1008 is satisfactory, for example.

The total composition of the wire sheath and core is such as to form an alloy coating of desired composition. As examples, there may be a sheath of mild steel and a core of iron, molybdenum and boron carbide powders to form iron-molybdenum alloy; or a sheath of nickel or cobalt and core of nickel (and/or cobalt), chromium, silicon and boron carbide powders to form self-fluxing alloys.

Although the alloying ingredients of the core may be present as elemental metals such as iron powder and molybdenum powder, it was found desirable to combine ingredients in the core powder into alloy form. For example, iron and molybdenum in the core may be present as ferromolybdenum alloy powder. Such alloy may be in the range of 50–95 percent by weight molybdenum, for example about 62 percent. Similarly, nickel and chromium may be present as nickel-chromium alloy, the chromium being 1 to 30 percent, typically 20 percent. Having the ingredients in alloy form results in more uniform alloying in the final thermal sprayed coating, and frequently the alloy is the most economic form of the ingredients. Further addition of elemental metals may be made to attain the desired composition for the coating.

The powder in the core, except for the boron-containing powder and carbon should be in the size range between about $-40$ and $+325$ mesh ($-420$ and $+44$ microns), and preferably $-80$ and $+200$ mesh ($-177$ and $+74$ microns). (Mesh sizes herein are U.S. standard.) Wire with powder fill greater than 40 mesh cannot be drawn properly. Powder finer than 325 mesh does not flow sufficiently well to give a uniform fill. Also, such fine powder tends to blow away without alloying or entrainment in the coating during spraying; surprisingly, this problem is insignificant for the fine boron-containing powder and carbon if included with the other, relatively coarse core powder.

The boron or boron carbide powder should preferably have a size predominantly less than about 20 microns and preferably between about 1 and about 15 microns, for example average 7 microns. Generally at least 95% by weight of the boron carbide should be smaller than 20 microns. The carbon similarly should be very fine such as less than 20 microns and may be in the form of graphitic carbon less than 5 microns. The amount of carbon is in proportion to the amount of elemental boron, and should be about 5 to 40 percent and preferably about 20 to 28 percent based on the boron.

In order to include boron and carbon in the wire, according to the present invention these elements are preferably provided in the core in the form of boron carbide powder that is sufficiently fine in size to be substantially dissolved or alloyed with the other, metallic ingredients of the core and sheath during the arc gun spraying process. Thus the resulting coating is virtually free of any discernable grains of boron carbide, at least when a coating is observed in metallurgical cross section by standard optical microscopy.

The boron carbide compound is typically the compound composition $B_4C$ but boron content may be generally in in the range of about 70 and 78 percent by weight. It was discovered that the fine boron carbide powder is especially effective in allowing for the desired alloying of boron and carbon into the other metallic ingredients of the sprayed coating.

The fine boron-containing powder should be blended uniformly with the other core powder ingredients before introducing the combination into the tube during the forming of the wire. In a preferred embodiment it was discovered that superior results were obtained when the boron carbide, or boron and carbon blend, was clad onto the other, coarser powder of the core; for example, onto the ferromolybdenum particles. The cladding may be accomplished by means of a binder, preferably an organic binder which may burn up during spraying, for example as described in aforementioned U.S. Pat. No. 3,991,240. The binder is preferably present in an amount of about 1 to 3 percent by weight of the total of the clad powder.

The binder material for cladding may be any known or conventional binding material which may be used for forming a coating or binding particles together or to a surface. The binder is preferably organic and may be a varnish containing a resin as the varnish solids, or may contain a resin which does not depend on solvent evaporation in order to form a cured or set film. The binder thus may contain a catalyzed resin as the varnish solids. Examples of binders which may be used include the conventional phenolic, epoxy or alkyd varnishes, varnishes containing drying oils, such as tung oil and linseed oil, rubber and latex binders and the like. The binder may alternatively be of the water-soluble type, as for example, of the polyvinylpyrrolidone or polyvinyl-alcohol type. In addition to organic binders, inorganic binders may be used, such as sodium silicate, boric acid, borax, magnesium or other soluble carbonates, nitrates, oxalates or oxychlorides, or colloidal suspensions containing oxides.

The coating of the core material with the binder containing the particles may be effected in any known or desired manner. It is simply necessary to mix the powdered ingredients together while allowing the binder to set and dry, which will result in a fairly free-flowing powder consisting of the core coated with the cladding of the boron carbide or the blend of boron and carbon.

The wires should have conventional sizes and accuracy tolerances for thermal spray wires and thus, for example, may vary in size between 6.4 mm and 0.8 mm. For arc spraying the wire is desirably between 2.4 mm and 1.6 mm (11 to 14 gauge).

The proportion of core should generally be in the range of about 10 to 50 percent by weight of the wire; and the core should be packed to a density of at least 60 percent of theoretical full density or, preferably, of sufficient density to avoid loose powder in the core.

A preferred type of wire has a mild steel sheath filled with $-80 +200$ mesh ($-177+74$ microns) ferromolybdenum powder and with boron carbide $B_4C$ powder averaging 7 microns in size. The molybdenum content should be 5 to 50, preferably 10 to 30 percent by weight of the wire. The boron carbide content should be 1 to 10, preferably 2 to 4 percent.

Another desired wire, of the self-fluxing type, comprises nickel sheath filled with $-80+200$ mesh ($-177$ 74 microns) nickel-chromium powder and with boron carbide $B_4C$ powder averaging 7 microns in size. The chromium content should be 5 to 50, preferably 10 to 30 percent by weight of the wire. The boron carbide content should be 1 to 10, preferably 2 to 4 percent. Silicon powder of size $-270$ mesh $+5$ microns ($-53+5$ microns) is also present in about 0.5 to 5.0 percent. Cobalt may be substituted for all or part of the nickel core and/or sheath. The self-fluxing type wires are sprayed in the conventional manner, preferably with a two-wire arc type thermal spray gun. The coatings produced according to the present invention have high density, high hardness and low friction and show an excellent combination of abrasive and scuff type wear resistance. The coatings optionally may subsequently be heat treated and fused.

The coatings of the present invention are excellently suited as bearing and wear surfaces on machine components, particularly where there are corrosive conditions as, for example, for coating petrochemical production equipment such as pump plungers, sucker rod couplings, sleeves, mud pump liners, and compressor rods; the circumference of automotive and diesel engine piston rings and cylinder walls; the interior surfaces of flue gas scrubbers for power generation and process industries; pulp and paper processing equipment such as digesters, de-barking machines, and recovery boilers; glass manufacturing equipment such as molds, mold plates, plungers, and neck rings; electric power generation boiler water walls, slope tubes, control valves, and pump components; gas turbine engine components such as nozzle and stator vane segments; machine ways; printing rolls; electroplating fixtures; rotary engine trochoids, seals and end plates; engine crankshafts; roll journals; bearing sleeves; impeller shafts; gear journals; fuel pump rotors; screw conveyors; wire or thread capstans; shifter forks; doctor blades; farming tools; motor shafts; lathe and grinder centers; cam followers.

EXAMPLE 1

Powder filled wire was produced using AISI 1008 steel strip 0.28 mm thick and 12.4 mm wide, powder filled, rolled into tubular wire and drawn in the manner described in U.S. Pat. No. 4,396,820 (Puschner). The core consisted of a ferromolybdenum alloy powder of iron and 62 percent molybdenum, plus boron carbide $B_4C$ powder. The ferromolybdenum powder was between $-420 +74$ microns in size and the boron carbide powder was average 7 microns. The powders were first prepared by cladding the boron carbide onto the ferromolybdenum as follows:

A polyvinylpyrrolidone (PVP) binder solution containing 250 gms of PVP per 750 cc of water was prepared. Approximately 400 cc of this solution was added to 4000 gms of the ferromolybdenum alloy core powder and mixed well. To this, about 250 gms of the boron carbide powder was slowly added and mixed thoroughly with additional water and the mixing continued until the binder dried, leaving a fairly free-flowing powder in which all of the alloy core particles were clad with a dry film which contained the boron carbide particles. The powder was warmed to about 120 degrees Centigrade to ensure complete drying. The powder so formed comprised particles of ferromolybdenum alloy core with fine boron carbide particles secured to the core with the binder.

The final wire contained 27.5 percent molybdenum and 3.00 percent boron carbide by weight, which corresponded to 2.35 percent boron and 0.75 percent carbon. Wire size was 2.4 mm (11 gauge).

The wire was thermal sprayed with an arc gun of the general type described in U.S. Pat. No. 3,632,952 and sold by the Metco division of The Perkin-Elmer Corporation as Type 4RG, with the following parameters; wire feed rate 5 kg/hr (11 lbs/hr) current 200 amperes, air pressure 60 psi (4 bar) for atomizing and 40 psi (2.7 bar) for air cap, and spray distance 15 cm. Excellent coatings were produced on a mild steel substrate prepared by grit blasting in the normal manner.

Upon examination of the coating cross section, it is obvious that the coatings which contain boron and carbon additions have lower oxide levels when compared to iron-molybdenum coatings which do not contain these additions. Although the mechanism is not fully understood, the addition of carbon and boron ($B_4C$) results in a very "clean", low oxide coating. Based upon metallurgical cross sectional analysis, microhardness and scuff testing, boron and carbon are interstitially dispersed throughout the coating matrix.

EXAMPLE 2

Additional wires of various proportions and powder sizes were similarly produced and thermal sprayed with the arc gun, having the compositions given in Table 1 (which includes Example 1 for comparison). These all had a sheath of mild steel and a core of boron-containing and ferromolybdenum powders as described in Example 1. Some core powders were prepared by mere blending (without cladding) as indicated.

TABLE 1

| Wire # | Fe[4] | Mo | B[1] | C[1] | Powder Form |
|---|---|---|---|---|---|
| 1[3] | Bal | 28.0 | 3.0 | 1.0 | Clad |
| 2 | Bal | 26.3 | 2.8 | 0.94 | Blend |
| 3[2] | Bal | 27.5 | 2.25 | 0.75 | Clad |
| 4 | Bal | 29.5 | 1.5 | 0.5 | Clad |
| 5 | Bal | 28.5 | 2.25 | 0.75 | Blend |
| 6 | Bal | 47.0 | 2.25 | 0.75 | Clad |
| 7 | Bal | 47.0 | 2.25 | 0.75 | Blend |
| 8[3] | Bal | 29.5 | 1.5 | 0.5 | Clad |

[1]Added as $B_4C$
[2]Example 1
[3]Average 7 micron $B_4C$ (all others have $-37$ micron $B_4C$)
[4]Includes sheath

EXAMPLE 3

A further set of wires, not within the scope of the present invention, was fabricated with compositions shown in Table 2. These all had mild steel sheath and ferromolybdenum powder in the core as described in Example 1. However, other core ingredients included, in place of boron carbide, elemental carbon, titanium carbide (TiC), and iron oxide ($Fe_3O_4$) and silicon carbide (SiC).

TABLE 2

| Wire # | Fe[2] | Mo | C | Ti[1] | $Fe_3O_4$[4] | Si[3] |
|---|---|---|---|---|---|---|
| 9 | Bal | 29.0 | — | | | |
| 10 | Bal | 24.7 | — | | | |
| 11 | Bal | 27.8 | 2.4 | | | |
| 12 | Bal | 25.0 | 1.4 | 5.76 | | |
| 13 | Bal | 23.2 | 2.25 | | 4.75 | |
| 14 | Bal | 24.0 | 1.8 | | | 4.2 |

[1]Added as $-44$ micron TiC
[2]Includes sheath
[3]Added as $-60$ microns SiC
[4]Added as $-20$ microns $Fe_3O_4$ Abrasive wear resistance for certain of the above examples was measured by placing coated samples in sliding motion against a cast iron plate with a slurry of 150 gms of between 53 and 15 micron aluminum oxide abrasive powder in 500 ml of water. A load of 3.3 kg/cm was applied and the surface motion was about 122 cm/sec for 20 minutes. Wear performance data was presented as a ratio of the thickness loss of the coating to the thickness loss of a molybdenum wire standard sprayed with a combustion gun; such molybdenum coatings are widely used on automotive piston compression rings.

Sliding wear resistance for the alloy of the example was determined with an Alpha LFW-1 friction and wear testing machine sold by Fayville-Levalle Corp., Downers Grove, Ill., using a 3.5 cm diameter test ring and 45 kg load at 197 RPM for 12,000 revolutions. The ring surface was cast iron.

Comparative results for coatings of the above examples are given in Table 3. Also included are results for the composite powder comprising cast iron core powder clad with molybdenum and boron powders plasma sprayed as described in Example 1 of U.S. Pat. No. 3,991,240.

TABLE 3

| Coating # | Thickness (mm) | Hardness (Rc) | Abrasive Wear Resist. | Coef. of Friction | Coat. Loss (mg) | Cast Iron Ring Loss (mg) |
|---|---|---|---|---|---|---|
| 1 | 1.25 | 43–57 | 1.6 | | | |
| 2 | 1.25 | 45 | | | | |
| 3 | 2.50 | 39–51 | 1.7 | .14–.16 | 0.3 | 5.5 |
| 4 | 2.50 | 39–47 | 1.4 | | | |
| 5 | 0.60 | 45–51 | 1.8 | 0.13 | 0.3 | 2.2 |
| 6 | 2.50 | 39–49 | 0.9 | | | |
| 7 | 2.50 | 30–43 | 0.62 | | | |
| 8 | 2.50 | 43–53 | | | | |
| 9 | 1.80 | 26 | | | | |
| 10 | | 25 | | | | |
| 11 | 1.80 | 25 | | | | |
| 12 | 1.9 | 25 | | | | |
| 13 | | $R_b85$ | | | | |
| 14 | | 30 | | | | |
| 15[1] | 1.0 | 40–45 | | 0.14 | 1.8 | 1.8 |

[1]Composite powder according to U.S. Pat. No. 3,991,240, Ex. 1

Generally the wires of the present invention when compared to the iron-molybdenum composite (coating 16) and molybdenum wire coatings showed an excellent combination of properties such as hardness, thickness limit and wear resistance. The coatings containing TiC, SiC, $Fe_3O_4$, and elemental carbon without boron present (coatings 9–14), were judged to be unacceptable based upon the low hardness and/or poor metallurgical microstructure.

EXAMPLE 4

Powder filled wire is produced using AISI 1008 steel strip 0.28 mm thick and 12.4 mm wide, using the same procedures as described in Example 1. The core consists of a ferromolybdenum alloy powder of iron and 62 weight percent molybdenum, plus 4.5 weight percent boron and 1.5 weight percent graphitic carbon. The ferromolybdenum, boron, and graphite powders are sized to $-420 +74$ microns, minus 20 microns and minus 20 microns, respectively.

The powder fill is prepared in the same manner as Example 1 except 140 grams of graphite and 410 grams of boron are added to 4000 grams of the ferromolybdenum alloy core powder and mixed well.

The final wire composition is nominally 27.5 weight percent molybdenum, 2.25 weight percent boron and 0.25 weight percent carbon. Spraying this wire in the manner of Example 1 results in coating properties comparable to those reported for Example 1.

EXAMPLE 5

Additional wire of self-fluxing type is similarly produced and thermal sprayed with the arc gun. Nickel sheath is used. The core powder consists of a blend of powders of 35% chromium, 6.5% molybdenum, 8% silicon and 8% boron carbide. All the sheath and powder sizes fabrication method and spray parameters are as described in Example 1. An excellent well-bonded coating is obtained.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A composite wire useful for arc gun spraying, formed of an alloy sheath comprising a metal selected from the group consisting of iron, nickel, cobalt and combinations thereof, and of a core comprising a boron-containing powder of at least one boron substance selected from the group consisting of boron and boron carbide, a substantial portion of the boron-containing powder being less than 20 microns in size.

2. A composite wire according to claim 1 wherein the core additionally comprises one or more core elements selected from the group consisting of the sheath metal, chromium and molybdenum.

3. A composite wire according to claim 2 wherein the core elements are contained in core powder having a size between 420 microns and 44 microns.

4. A composite wire according to claim 3 wherein the wire further comprises an organic binder and is fabricated from composite powder comprising the core powder clad with the boron-containing powder contained in the organic binder.

5. A composite wire according to claim 2 wherein the core comprises about 10 to 50 percent by weight of the wire.

6. A composite wire according to claim 1 wherein the sheath is formed of nickel and the core additionally comprises nickel-chormium alloy powder.

7. A composite wire according to claim 6 wherein the core additionally comprises silicon.

8. A composite wire according to claim 7 wherein the boron in the boron-containing powder is present in an amount of about 0.75 to 7.5 percent, the chromium is present in an amount of about 5 to 50 percent and silicon is present in an amount of about 0.5 to 5.0 percent by weight of the wire.

9. A composite wire according to claim 1 wherein the boron substance includes boron powder and the core further comprises carbon powder less than 20 microns in size blended with the boron powder.

10. A composite wire according to claim 2 wherein the carbon powder is present in an amount of about 5 to 40 percent by weight ofthe boron powder.

11. A composite wire according to claim 1 wherein the sheath is formed of mild steel and the core additionally comprises ferromolybdenum alloy powder.

12. A composite wire according to claim 11 wherein the boron in the boron-containing powder is present in an amount of about 1 to 10 percent and the molybdenum in the ferromolybednumm is present in an amount of between about 5 and about 50 percent the percentages being by weight of the wire.

13. A composite wire according to claim 1 wherein the boron-containing powder has a size between about 15 microns and about 1 micron.

14. A composite wire according to claim 1 wherein the diameter of the wire is between about 0.8 mm and about 6.4 mm.

15. A composite wire according to claim 1 wherein the sheath comprises nickel and the core additionally comprises chromium.

16. A composite wire useful for arc gun spraying, formed of an alloy sheath comprising iron and a core comprising ferromolbdenum alloy and boron carbide, a substantial portion of the boron carbide powder being less than 20 microns in size.

17. A composite wire according to claim 16 wherein the ferromolybdenum alloy is in the form of powder having a size between 420 microns and 44 microns.

18. A composite wire according to claim 17 wherein the wire further comprises an organic binder and is fabricated from composite powder comprising the ferromolybdenum alloy powder clad with the boron carbide powder contained is the organic binder.

19. A composite wire according to claim 16 wherein the boron carbide powder has a size between about 15 microns and about 1 micron.

20. A composite wire according to claim 16 wherein the diameter of the wire is between about 0.8 mm and about 6.4 mm.

21. A composite wire according to claim 16 wherein the core comprises about 10 to 50 perpcent by weight of the wire.

22. A composite wire according to claim 16 wherein the sheath iron is in the form of mild steel.

23. A composite wire according to claim 16 wherein the boron is the boron carbide powder is present in an amount of about 1 to 10 percent and the molybdenum in the ferromolybdenum alloy is present in an amount of between about 5 and about 50 percent, the percentages being by weight of the wire.

24. A composite wire useful for arc gun spraying, formed of an alloy sheath comprising iron and a core comprising iron and molybdenum and further comprising a boron-containing powder consisting essentially of boron and carbon, a substantial portion of the boron-containing powder being less than 20 microns in size.

25. A composite wire according to claim 24 wherein the boron-containing powder is in the form of boron powder and carbon powder, the carbon powder being less than 20 microns in size blended with the boron powder.

26. A composite wire according to claim 25 wheein the carbon powder is present in an amount of about 5 to 40 percent by weight of the boron powder.

27. A composite wire according to claim 24 wherein the core iron and the molybdenum are in the form of ferromolybdenum alloy powder.

28. A composite wire according to claim 27 wherein the boron in the boron-containing powder is present in an amount of about 1 to 10 percpent and the molybdenum in the ferromolybdenum alloy is present in an amount of between about 5 and about 50 percent, the percentages being by weight of the wire.

29. A composite wire according to claim 24 wherein the core iron and the molybdenum are contained in core powder having a size between 420 microns and 44 microns.

30. A composite wire according to claim 29 wherein the wire further comprises an organic binder and is fabricated from composite powder comprising the core powder clad with the boron-containing powder contained in the organic binder.

31. A composite wire according to claim 24 wherein the boron-containing powder is in the form of boron carbide.

32. A composite wire according to claim 24 wherein the boron-containing powder has a size between about 15 microns and about 1 micron.

33. A composite wire according to claim 24 wherein the diameter of the wire is between about 0.8 mm and about 6.4 mm.

34. A composite wire according to claim 24 wherein the core comprises about 10 to 50 percent by weight of the wire.

35. A composite wire according to claim 24 wherein the sheath iron is in the form of mild steel.

36. A composite wire useful for arc gun spraying, formed of an alloy sheath comprising a metal selected from the group consisting of iron, nickel and cobalt, and a core comprising a boron-containing powder of boron carbide, a substantial portion of the boron-containing powder being less than 20 microns in size.

37. A composite wire useful for arc gun spraying, formed of a sheath of mild steel and a core, the core comprising boron carbide powder having a size between about 15 microns and 1 micron and ferromolybenum powder having a size between about 420 microns and about 44 microns, the boron in the boron carbide being present in an amount of about 1 and 10 percent and the molybdenum in the ferromolybdenum being present in an amount of about 5 and 50 percent, the percentages being by weight of the wire.

38. A composite wire useful for arc gun spraying, formed of a sheath of nickel and a core, the core comprising boron carbide powder having a size between about 15 microns and 1 micron, nickel-chromium alloy powder having a size between about 420 microns and about 44 microns, and silicon powder having a size between about 10 microns and about 1 micron, the boron in the boron carbide being present in an amount of about 0.75 to 7.5 percent, the chromium in the alloy powder being present in an amout of about 5 to 50 percent and the silicon being present in an amount of about 0.5 to 5 percent, the percentage being by weight of the wire.

* * * * *

UNITED STATES PATENT AND TRADEMARK OFFICE
CERTIFICATE OF CORRECTION

PATENT NO. : 4,741,974
DATED     : May 3, 1988
INVENTOR(S) : Frank N. Longo, Joseph D. Reardon, Anil Bansal It is certified that error appears in the above-identified patent and that said Letters Patent are hereby corrected as shown below:

In Column 9, line 40 (Claim 10, line 1) change "2" to --9--.

Signed and Sealed this

Twenty-ninth Day of November, 1988

*Attest:*

DONALD J. QUIGG

*Attesting Officer*     *Commissioner of Patents and Trademarks*